US010093456B2

(12) United States Patent
Georges et al.

(10) Patent No.: US 10,093,456 B2
(45) Date of Patent: Oct. 9, 2018

(54) METHOD FOR MANUFACTURING A BAG BY MEANS OF BLOWN FILM EXTRUSION

(71) Applicant: S2F FLEXICO, Henonville (FR)

(72) Inventors: Philippe Georges, Chantilly (FR); Henri Bois, Neuilly-sur-Seine (FR); William Delasalle, Cresnes (FR)

(73) Assignee: S2F FLEXICO, Henonville (FR)

( * ) Notice: Subject to any disclaimer, the term of this patent is extended or adjusted under 35 U.S.C. 154(b) by 0 days.

(21) Appl. No.: 14/910,599

(22) PCT Filed: Aug. 6, 2014

(86) PCT No.: PCT/EP2014/066891
§ 371 (c)(1),
(2) Date: Feb. 5, 2016

(87) PCT Pub. No.: WO2015/018859
PCT Pub. Date: Feb. 12, 2015

(65) Prior Publication Data
US 2016/0176580 A1    Jun. 23, 2016

(30) Foreign Application Priority Data
Aug. 6, 2013 (FR) .................... 13 57823

(51) Int. Cl.
*B65D 33/25* (2006.01)
*B29C 47/00* (2006.01)
(Continued)

(52) U.S. Cl.
CPC .......... *B65D 33/25* (2013.01); *B29C 47/0026* (2013.01); *B29C 47/04* (2013.01);
(Continued)

(58) Field of Classification Search
CPC ........................... B65D 33/25; B65D 33/2541; B29C 47/0026; B29C 47/04; B29C 55/28;
(Continued)

(56) References Cited

U.S. PATENT DOCUMENTS 3,172,443 A * 3/1965 Ausnit .................... B29C 47/14
383/203
3,380,481 A    4/1968 Kraus
(Continued)

FOREIGN PATENT DOCUMENTS

JP    H0724926    1/1995
JP    2011036642    2/2011

OTHER PUBLICATIONS

International Search Report with English Language Translation, dated Dec. 4, 2014, Application No. PCT/EP2014/066891.
(Continued)

*Primary Examiner* — Peter Helvey
(74) *Attorney, Agent, or Firm* — Womble Bond Dickinson (US) LLP

(57) ABSTRACT

The invention relates to a method for manufacturing (S) a bag (3) by means of blown film extrusion, including the following steps: extruding (S2) plastic such as to form an annular film (2) including closing assemblies (10, 20), said annular film being intended to form the walls of the bag; and blowing (S5) the annular film such as to form a sheath, the complementary profile sections (14, 24) of each of the closing assemblies (10, 20) being integrally formed with a base (18, 28) connected to the annular film (2) via a connection rod (19, 29) that extends parallel to the longitudinal axis (X) between the annular film (2) and the base (18, 28) and is designed to keep the base (18, 28) separated from the annular film (2).

13 Claims, 6 Drawing Sheets

(51) Int. Cl.
  *B29C 47/04* (2006.01)
  *B29C 55/28* (2006.01)
  *B29L 31/00* (2006.01)
  *B29K 101/12* (2006.01)
  *B29K 105/00* (2006.01)
(52) U.S. Cl.
  CPC .......... *B29C 55/28* (2013.01); *B65D 33/2541* (2013.01); *B29C 47/0057* (2013.01); *B29C 47/0064* (2013.01); *B29K 2101/12* (2013.01); *B29K 2105/256* (2013.01); *B29L 2031/7128* (2013.01)
(58) Field of Classification Search
  CPC ............ B29C 47/0057; B29C 47/0064; B29K 2101/12; B29K 2105/256; B29L 2031/7128
  USPC .......................................................... 383/63
  See application file for complete search history.

(56) References Cited

U.S. PATENT DOCUMENTS

| | | | |
|---|---|---|---|
| 4,791,710 A * | 12/1988 | Nocek | B65D 33/2516 24/114.4 |
| 4,863,286 A * | 9/1989 | Branson | B65D 33/2541 24/585.12 |
| 4,878,763 A * | 11/1989 | Ausnit | B65D 33/2508 24/585.12 |
| 4,929,487 A | 5/1990 | Tilman et al. | |
| 5,017,021 A * | 5/1991 | Simonsen | B65D 33/2541 383/63 |
| 5,272,794 A * | 12/1993 | Hamatani | A44B 19/16 24/586.1 |
| 6,185,796 B1 | 2/2001 | Ausnit | |
| 7,784,160 B2 * | 8/2010 | Dais | B65D 33/2508 24/585.12 |
| 7,914,208 B2 * | 3/2011 | Sprehe | B65D 33/2541 24/30.5 R |
| 8,950,045 B2 * | 2/2015 | Anzini | B65D 33/2591 24/400 |
| 9,365,326 B2 * | 6/2016 | Bois | B65D 33/2508 |
| 2008/0285897 A1 | 11/2008 | Taheri | |
| 2009/0025191 A1 | 1/2009 | Kosub et al. | |
| 2010/0209020 A1 | 8/2010 | Delasalle | |

OTHER PUBLICATIONS

French Search Report, dated May 16, 2014, French Application No. 1357823.

* cited by examiner

METHOD FOR MANUFACTURING A BAG BY MEANS OF BLOWN FILM EXTRUSION

FIELD OF THE INVENTION

The invention relates to the field of closure devices for bags, sacks or the like.

TECHNOLOGICAL BACKGROUND

More precisely the present invention relates to closure devices having complementary profiles 10', 20' borne by respective opposite support webs or walls 12', 22' such as illustrated by way of non-limiting example in the appended FIG. 1. Many variant embodiments of the device illustrated in FIG. 1 have already been proposed and fall within the scope of the present invention.

Generally, the abovementioned complementary profiles are formed from complementary male/female elements, the male element comprising a rod 14' secured to the web or to the wall 12' and provided with an widened protrusion 15' at its top, while the female element 20' can be formed by a groove 24' with convergent edges having as a section a complementary cavity of the protrusion 15'.

Closure devices comprising several parallel complementary profiles also have been proposed to improve the closing and the sealing of the bags to which these devices are fixed.

Yet the applicant has noticed that when the closure devices comprised multiple profiles, and in particular complementary profiles of male/male or female/female type, especially in the form of an arrow, coextrusion of the complementary profiles with their support web and the film intended to form the walls of the bag tends to deform the closure devices, in particular when the device is formed by means of blown film extrusion.

The blown film extrusion method consists of extruding material, generally thermoplastic, through an annular die then blowing it to form a jacket which is then cooled and rolled up.

An embodiment of a manufacturing machine by means of blown film extrusion is illustrated in FIG. 8. During a first step, plastic material, generally based on polyethylene, is introduced to an extruder.

During a second step, the plastic material is heated and extruded so as to plasticize it and form via an annular die a film of annular form.

During a third step, air is blown inside the film to inflate it and form a jacket (or bubble). The inflation rate (ratio between the diameter of the jacket after inflation and the diameter of the film leaving the die) is generally comprised between 1.5 and 3.5 to obtain good extrusion qualities. Air is also blown onto the jacket from the outside of the latter by a ring system to cool the extruded and blown film.

During a fourth step, the film is flattened using nip rollers.

This method produces very fine films. But when the film, which is intended to form the walls of a bag, is coextruded with a closure device comprising several complementary profiles, at the exit of the die, necking of the closure device differs from necking of the film. This different necking creates stresses at the interface, especially between the closure device and the film, the effect of which is retracting or dilating the support webs and therefore moving apart or bringing together the complementary profiles to or from each other respectively.

This deformation effect therefore creates spaces between the complementary profiles during their engagement, likely to let through fluids and/or fine particles contained in the bag, or to the contrary bring them together to such a point where the profiles stick together. Also, the resulting closure devices are more difficult to close by mutual engagement of the associated complementary profiles, and risk opening more easily.

For some bags it is necessary to make closure devices with multiple complementary profiles, integrally formed with the film and preferably via blown film extrusion. This is the case especially of closure devices configured to generate a tactile sensation and a sound effect during closing and opening, that is, respectively during engagement and separation of the profiles. An example of such devices is described in document WO 2013/076120. In particular this document describes a closure device for bags or the like comprising two support webs or walls 12' provided on their internal face with a complementary closing assembly comprising a series of complementary profiles 10' which extend in parallel in a main direction extending according to a longitudinal axis (FIG. 2). At least one of the complementary profiles 10' has sequential alterations 11' according to a direction perpendicular to the support webs. These sequential alterations can comprise sequential crushing of the engaged profiles, such that the sequential crushing effect flares both complementary profiles in the direction of the width transversal to the elongation direction of the closure device, incisions without removal of material, optionally stretched to form cuts, and/or cuts with removal of material.

In practice it proves necessary to make these closure devices by means of blown film extrusion, this method easily producing, and at reasonable cost, bags comprising a closure device integrally formed and in a single piece with its walls. This manufacturing method in fact prevents report of the closing assemblies after the walls of the bag have been made.

It is therefore possible to correct the form of the die of the extruder to anticipate the deformations of the profiles due to inflation of the jacket. But the applicant has noticed that such correction was not enough to ensure engagement of the complementary profiles. In fact, it turns out that the complementary profiles obtained using a corrected die tend to stick to each other when correction is done so as to bring them together by anticipation of inflation of the film, or to the contrary stick to the film if the correction consists of moving them apart.

SUMMARY OF THE INVENTION

An objective of the invention is therefore to propose a method for manufacturing by means of blown film extrusion a closure device and an associated closure device, comprising at least three complementary profiles, which is sealed more tightly than the known multiple closure devices and which can be easily obtained for a modest cost.

Another objective of the invention is to propose a method for manufacturing by means of blown film extrusion a closure device having tactile and sound effects and an associated closure device having tactile and sound effects, whereof the sealing is improved for a modest cost, and which can be obtained especially by means of a blown film extrusion method.

For this, the invention proposes a method for manufacturing a bag by means of blown film extrusion, said bag comprising main walls each comprising, on an internal face, a closing assembly comprising a series of complementary profiles which extend in parallel in a main direction extending according to a longitudinal axis, the manufacturing method comprising the following steps:

extruding plastic material so as to form an annular film comprising the closing assemblies, said annular film being intended to form the walls of the bag, and blowing the annular film so as to form a jacket, wherein during the extrusion step, the complementary profiles of each of the closing assemblies are integrally formed with a base, connected to the annular film by means of a connecting rod extending in parallel to the longitudinal axis between the annular film and the base and configured to keep the base at a distance from the annular film.

Some preferred but non-limiting characteristics of the manufacturing method are the following:

the inflation rate is less than 1.5, the inflation rate is less than 1.3, the stretch rate is comprised between 5 and 15, during the extrusion step, the complementary profiles of each closing assembly are integrally formed with their respective base by means of the associated connecting rod, the complementary profiles are of male/male or female/female type, at least one of the closing assemblies comprises at least four complementary profiles, said complementary profiles of the at least one closing assembly forming at least two groups of complementary profiles respectively extending from at least two separate bases, each of these separate bases being connected to the film by means of an associated connecting rod, the connecting rod centrally extends from the base of the corresponding closing assembly, the base comprises two longitudinal edges substantially extending in parallel to the longitudinal axis, and the manufacturing method further comprises a step during which one of the longitudinal edges of the base is locally fixed to the film, each closing assembly comprises at least three complementary profiles, further comprising a step during which all or some of the complementary profiles of at least one of the closing assemblies is sequentially altered, the sequential alterations now formed transversally extending to the longitudinal axis, at least one of the complementary profiles is devoid of sequential alterations, the connecting rod is discontinuous in its longitudinal direction according to the longitudinal axis, the complementary profiles are integrally formed with at least one intermediate base, connected to the base by means of an intermediate connecting rod extending in parallel to the longitudinal axis between the base and the intermediate base and adapted to keep the intermediate base at a distance from the base, and at least one of the closing assemblies comprises at least four complementary profiles, and wherein the complementary profiles are integrally formed with at least one intermediate base, connected to the base by means of an intermediate connecting rod extending in parallel to the longitudinal axis between the base, the intermediate base and adapted to keep the intermediate base at a distance from the base.

According to a second aspect, the invention also proposes a bag comprising main walls each including, on an internal face, a closing assembly comprising a series of complementary profiles which extend in parallel in a main direction extending according to a longitudinal axis, the bag being obtained as per a manufacturing method as described hereinabove.

BRIEF DESCRIPTION OF THE DRAWINGS

Other characteristics, aims and advantages of the present invention will emerge more clearly from the following detailed description and in relation to the appended drawings given by way of non-limiting examples and in which.

DETAILED DESCRIPTION OF AN EMBODIMENT

Figure 1:
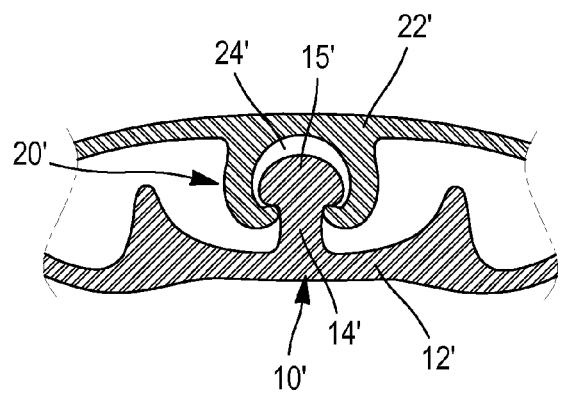
FIG. 1 is a sectional view of a first example of a closure device according to the prior art.
Figure 2:
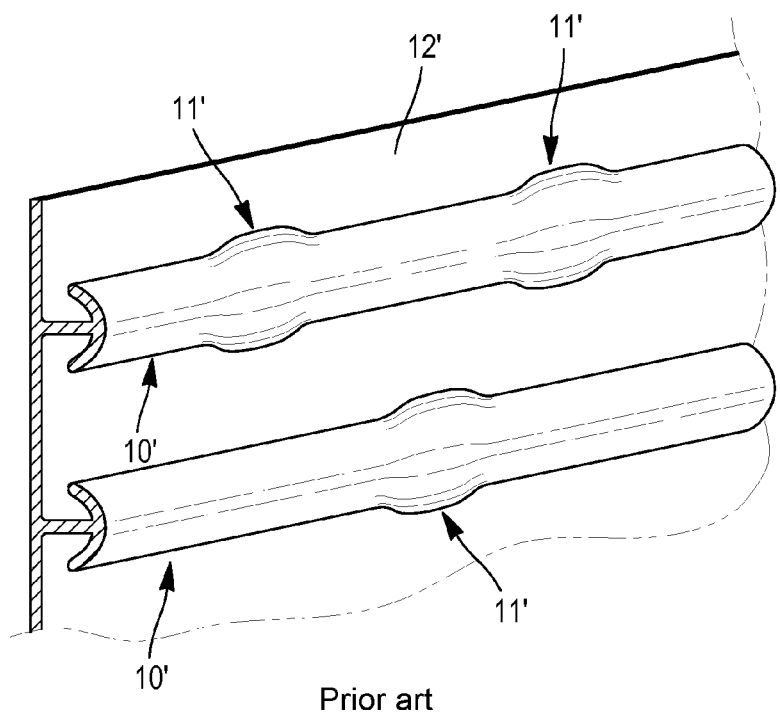
FIG. 2 is a perspective view of a closing assembly of a closure device according to the prior art.

A bag 3 which can comprise a closure device 1 according to the invention is illustrated in FIGS. 3 to 7. The bag comprises two main walls 2 provided on their internal face 13, 23 with a complementary closing assembly 10, 20 comprising a series of complementary profiles 14, 24 extending in parallel in a main direction extending according to a longitudinal axis X. Preferably, each closing assembly 10, 20 comprises at least three complementary profiles, for example between three and six, and is integrally formed and in a single piece with the walls of the bag 3.

These can be complementary profiles 14, 24 of male/male, female/female type, or hooks, etc. conventionally making up a bag 3 per se. The particular embodiments of such a bag 3, in its general structure, will not be described in more detail hereinbelow.

Therefore, the complementary profiles 14, 24 can comprise a rod 15, 25 overall perpendicular to the film 2 and fitted at its top opposite the film 2 with a flared protrusion 16, 26, for example in the form of an arrow. These complementary profiles 14, 24 are adapted to be engaged at their flared protrusion 16, 26.

The walls 2 of the bag 3 can form the subject matter of many embodiments and are preferably walls 2 made of thermoplastic materials. These walls 2 can be single- or multi-layer and single or multi-material.

The bag 3 is preferably made via blown film extrusion S.

For this, during a first step S1, plastic material 100 comprising a polymer or a mixture of polymers is introduced into an extruder 110. The plastic material 100 comprises typically polypropylene, polyethylene, high-density polyethylene and/or low-density polyethylene and their associated copolymers, ethylene copolymers and/or propylene copolymers.

During a second step S2, the plastic material 100 is heated and extruded so as to plasticize it and form, via an annular die 120, a film of annular form whereof the thickness is substantially equal to that of the air gap of the die 120. The film is intended to form the walls of the bag 3. On leaving the die 120 the resulting annular film further comprises the closing assemblies 10, 20 on its internal faces 13, 23.

For this, as is known per se the extruder 110 comprises a die 120 whereof the annular slot comprises two series of grooves extending facing configured to conform the closing assemblies 10, 20, and the form of which therefore corresponds to those of said assemblies.

During a third step S3, air 125 is blown inside the film 2 to inflate it and form a jacket 105 (or bubble).

In an embodiment, the inflation rate (ratio between the diameter of the jacket 105 after inflation and the diameter of the film 2 leaving the die 120) is less than 1.5, preferably less than 1.3. The applicant has in fact noticed that the disadvantage to the resulting bags with a conventional inflation rate greater than 1.5 is having to turn the jacket 105, making the method unstable, and deforming the complementary profiles 14, 24 by extending them transversally to the direction of travel of the film 2. By comparison, employing an inflation rate less than 1.5, preferably less than 1.3, produces closing assemblies 10, 20 whereof the section is substantially homothetic relative to the section of the slot of the die 120, clearly improving the stability of the jacket 105.

The stretch rate (ratio between the speed of the drawing bench, that is, the speed of the film at the nip rollers 140, and the speed of the material leaving the die 120) can also be between 5 and 15. Such inflation and stretch rates select a die 120 with a sufficiently small air gap (dimensions of the slot) to produce a bag 3 whereof the walls are of minimal thickness and have good mechanical properties and good homogeneity of material.

During a fourth step S4, air is sent to the jacket 105 to cool the extruded and blown film 2 and the closing assemblies 10, 20.

In a first embodiment, air can be blown from outside the jacket 105 via a ring system 130.

Also or alternatively, air can also be blown from the inside of the jacket 105 to cool the latter and prevent sticking of the internal faces of the jacket 105 during nipping of the latter by the nip rollers 140 (fifth step S5).

The cooling of the jacket 105 is preferably sufficient so that the jacket 105 reaches a temperature lower than its crystallization temperature from its formation by inflation. Cooling systems (external and/or internal) are therefore preferably arranged at the exit of the die 120.

During a fifth step S5, the jacket 105 is flattened by means of the nip rollers 140, configured to nip the jacket 105 and create sealing to form said jacket 105 by inflation.

To improve sealing of the closure device 1, the complementary profiles 14, 24 of each of the closing assemblies 10, 20 are integrally formed and in a single piece with a respective base 18, 28, connected to the film 2 by means of an associated connecting rod 19, 29 extending in parallel to the longitudinal direction X and adapted to keep the base 18, 28 at a distance from said film 2.

The connecting rod 19, 29 has a width (dimension in the direction transversal to the longitudinal axis X) substantially less than the width (dimension in the direction transversal to the longitudinal axis) of the base 18, 28, for example of the order of two to fifteen times less, typically from five to ten times less (according to the number of complementary profiles 14, 24 borne by the base 18, 28). It is evident that the longitudinal direction X corresponds to the direction of travel of the film 2 in the machine during the manufacturing method S.

The width of the rods 19, 29 can also be less than or equal to the height of the bases 18, 28 (dimension of the base 18, 28 as per the axis defined by the direction of extension of the rods 19, 29 from the film 2). Here, the width of the rods 19, 29 is substantially equal to the height of the corresponding base 18, 28.

The connecting rod 19, 29 isolates the complementary profiles 14, 24 from the film 2, which decorrelates deformation of the film from that of the complementary profiles 14, 24, especially during inflation and cooling of the jacket 105. Also, the minimal transversal dimension of the rod limits transmission of forces and deformations between the film and the associated base 18, 28. In fact, being of minimal transversal dimension, the rod 19, 29 is not deformed (or at least negligibly) during the inflation and cooling of the jacket 105 during the manufacturing method S of the bag 3, and therefore communicates no deformation (in withdrawal or stretching) of the film to the base, and vice versa. Any deformations of the film are therefore no longer transmitted to the base 18, 28 supporting the complementary profiles 14, 24, to the extent where this base 18, 28 is connected to the film only by means of the connecting rod 19, 29. In other words, due to the presence of a rod 19, 29 at each closing assembly 10, 20, the complementary profiles 14, 24 and the film behave as if they were extruded independently of each other.

With the base 18, 28 supporting the complementary profiles 14, 24 not being deformed during inflation and cooling of the jacket 105, the result therefore is a closure device 1 whereof the complementary profiles 14, 24 extend substantially parallel relative to each other, effectively improving sealing of the closure device 1 without the need to modify their profile or the manufacturing protocol of the blown film extrusion device.

The presence of the connecting rod 19, 29 further forms a hinge between the film 2 and the complementary profiles 14, 24 which makes separation of the closing assemblies 10, 20 more difficult and reduces the risk of accidental opening of a bag 3 fitted with the device 1, for example due to forces applied by the content of the bag 3 on the closure device 1. The opening of the bag 3 is therefore made more difficult, to the extent where on the one hand the closing assemblies 10, 20 are not deformed due to the presence of the connecting rod 19, 29 which limits the transmission of forces (due to withdrawals/dilations) between the film 2 and the base 18, 28, and on the other hand transversal stress exerted by the walls 2 on the closure device 1 is dampened by articulation of the film 2 about the rod.

In an embodiment, the base 18, 28 of the closing assemblies 10, 20 can be fixed to the film 2 in a zone adjacent to one of its longitudinal edges 30 to form a hinge, for example using local welding or by adhesion. This local fixing of an edge 30 of the base 18, 28 creates a center of rotation for the closing assembly 10, 20 and improves resistance to opening of the closure device 1. In fact, the connecting rod 19, 29 confers a certain mobility to the complementary profiles 14, 24 relative to the film 2, while the local fixing plays a role of hinge and transforms the forces undergone by the closing elements in shearing forces.

Figure 4:
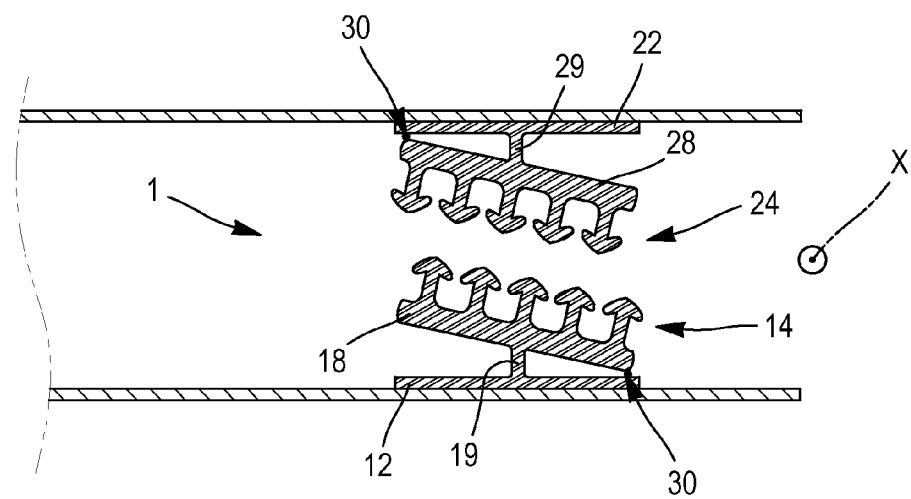
FIG. 4 is a sectional view of an embodiment of a closure device according to a second embodiment of the invention.

In an embodiment, the longitudinal edges facing the bases 18, 28 can be fixed to the film 2. As a variant, local fixing can be done at the opposite longitudinal edges 30 of the bases 18, 28 to further improve the hinge effect, as illustrated in FIG. 4. If needed, the closing assemblies 10, 20 (connecting rods 19, 29, bases 18, 28 and complementary profiles 14, 24) are offset to ensure correspondence of the complementary profiles 14, 24 and improve their mutual engagement.

According to an embodiment, the connecting rods 19, 29 centrally extend relative to the base 18, 28 they connect to the film 2. Advantageously, the complementary profiles 14, 24 are fixed to the base 18, 28 such that the closing assembly 10, 20 is substantially symmetrical.

Figure 3:
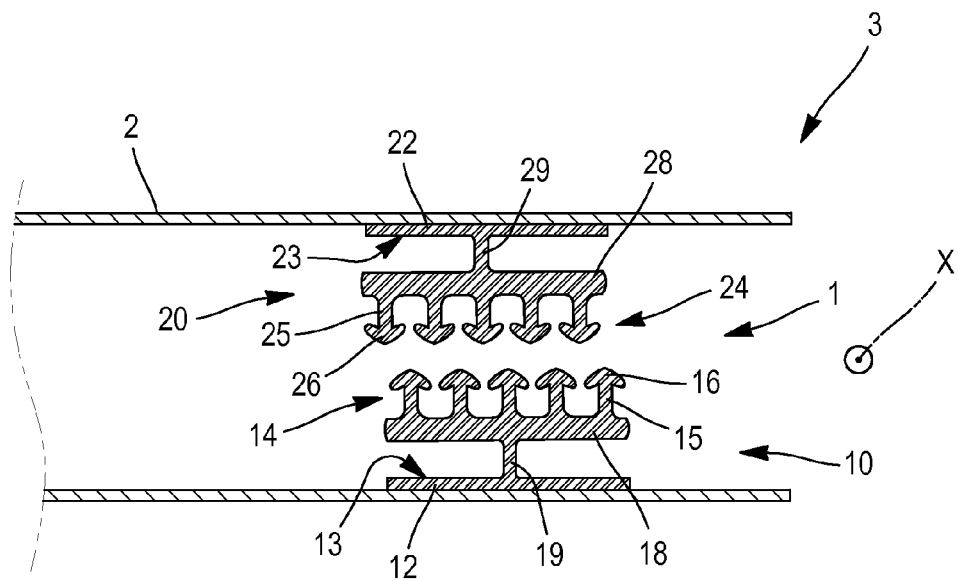
FIG. 3 is a sectional view of an embodiment of a closure device according to a first embodiment of the invention.

For example, the closing assemblies 10, 20 can each comprise five complementary profiles 14, 24, symmetrically distributed on the base 18, 28 relative to the connecting rod 19, 29. As illustrated in FIG. 3, one of the profiles 14, 24 extends in the extension of the connecting rod 19, 29, while the four other complementary profiles 14, 24 extend on either side of the central complementary profile 14, 24.

Figure 5:
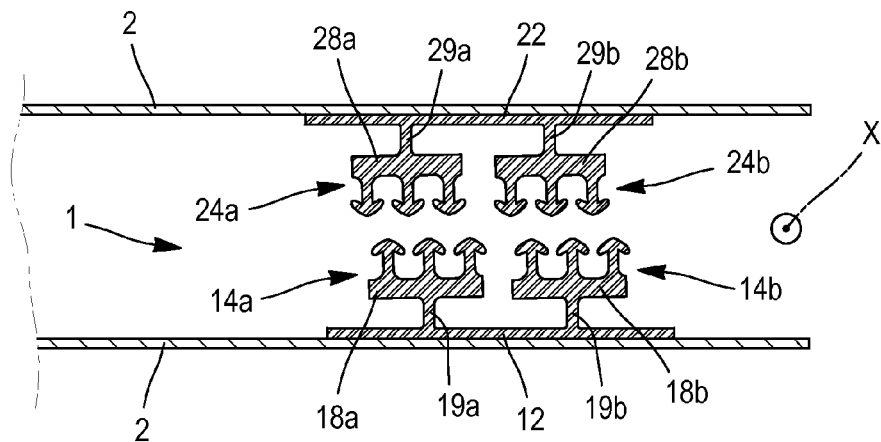
FIG. 5 is a sectional view of an embodiment of a closure device according to a third embodiment of the invention.

The complementary profiles 14, 24 of the closing assemblies 10, 20 can also be fixed to several separate bases 18a, 18b, 28a, 28b. As illustrated in FIG. 5, a first number of the complementary profiles 14a, 24a can extend into the extension of a first connecting rod 19a, 29a from a first base 18a, 28a, while the remaining number of complementary profiles 14b, 24b extends in the extension of the connecting rod 19b, 29b of a second base 18b, 28b, the first base 18a, 28a and the second base 18b, 28b being connected to the film by means of their respective connecting rod 19a, 29a, 19b, 29b. The first base 18a, 28a and the second base 18b, 28b preferably extend in parallel to the film and in the same plane. Also, as illustrated in FIG. 5, the film is such that the distance between the bases 18a-18b, 28a-28b is greater than the distance between two adjacent profiles to form two distant groups of complementary profiles 14a, 14b, 24a, 24b.

As a variant, the complementary profiles 14a, 14b, 24a, 24b can also be fixed via their respective bases 18a, 18b, 28a, 28b to the film so as to extend at equal distance from each other.

In a variant embodiment, when the closing assembly 10, 20 comprises many complementary profiles 14, 24, the complementary profiles 14, 24 can be fixed to the film by means of intermediate bases 18c which are in turn fixed to the base 18 by means of corresponding connecting rods 19c. This variant embodiment has the advantage of filtering deformations due to stretching removal of the film by way of the rod 19, but also those due to any removal of the base 18. In effect, when the closing assembly 10, 20 comprises many complementary profiles, the corresponding base 18 must be relatively wide so that it can undergo removal via stretching during inflation and cooling likely to deform the complementary profiles 14, 24. By way of the intermediate bases 18c and their connecting rod respective 19c, it is therefore possible to limit transmission of forces to the complementary profiles 14, 24, and therefore improve sealing of the closure device 1.

Figure 7:
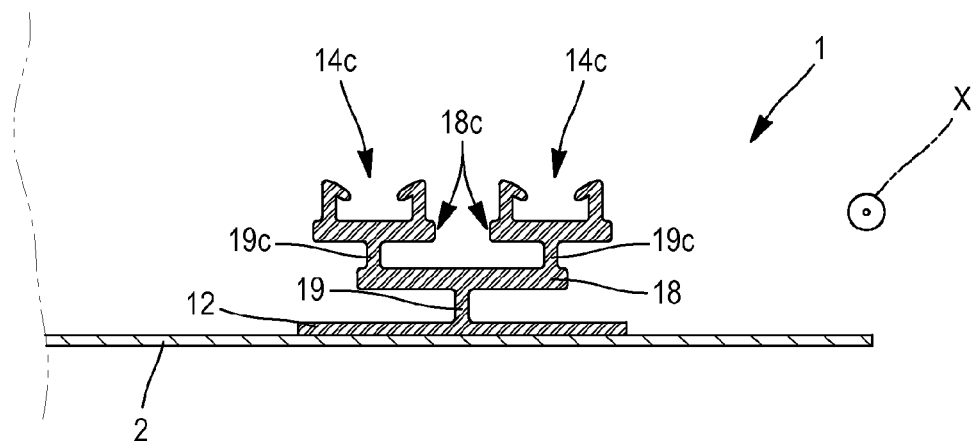
FIG. 7 is a sectional view of an embodiment of a closing assembly according to a fourth embodiment of the invention.
Figure 8:
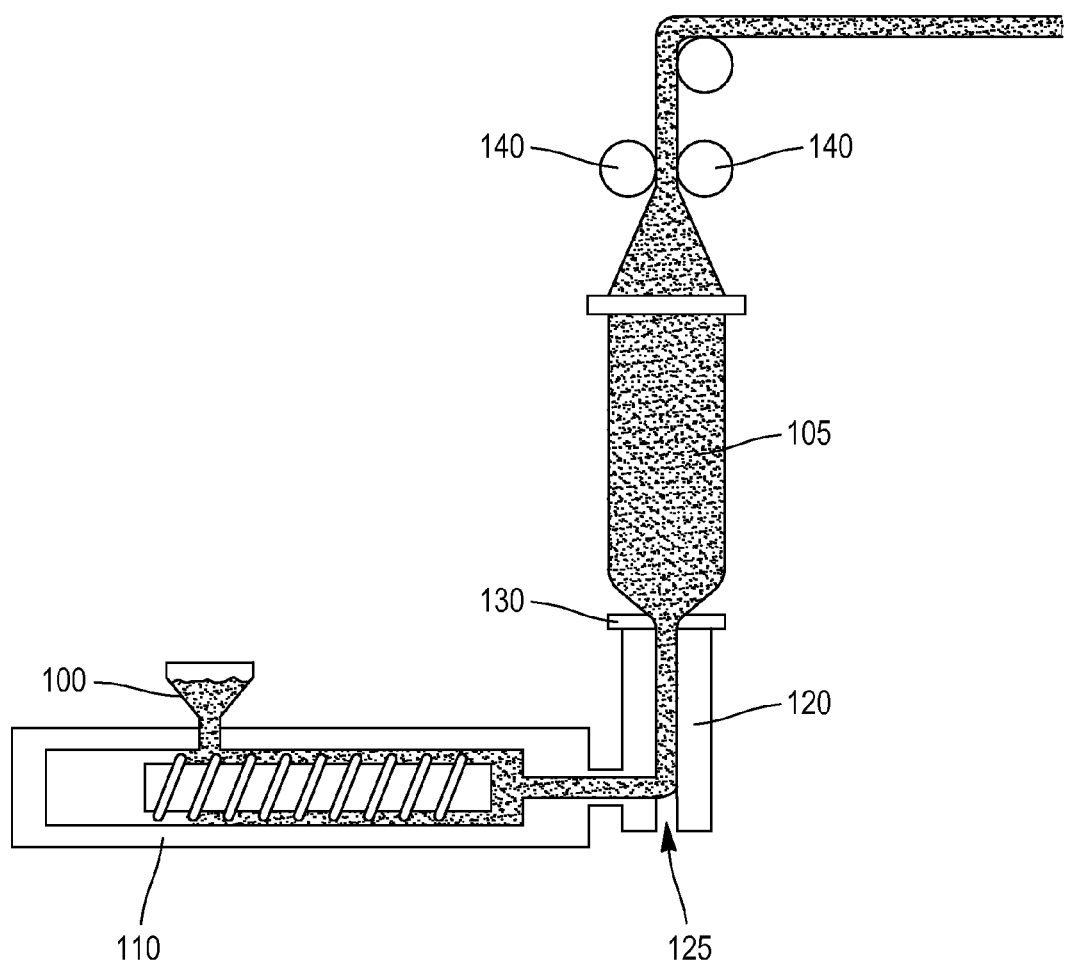
FIG. 8 illustrates an example of a machine for a method for manufacturing by means of blown film extrusion.
Figure 9:
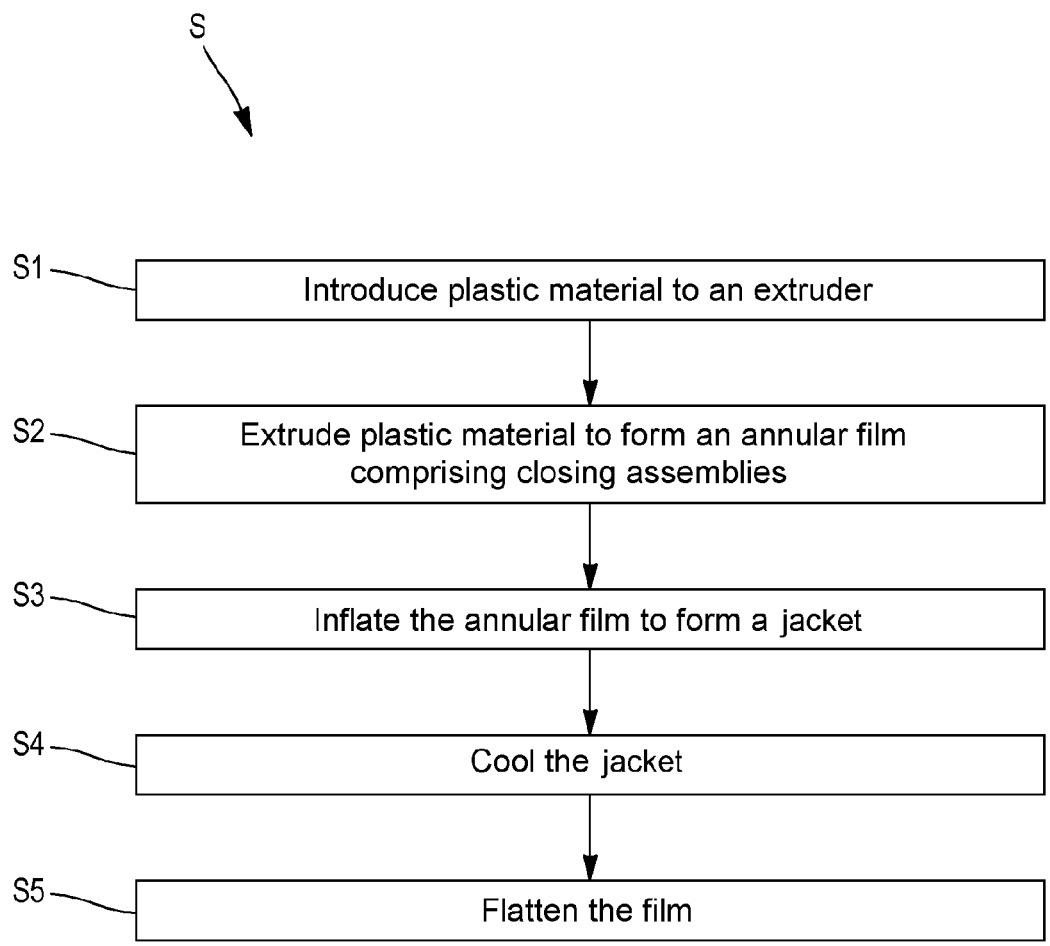
FIG. 9 is an flow chart illustrating different steps of an example of a method for manufacturing by means of blown film extrusion according to the invention.

An example of such a variant embodiment is illustrated in FIG. 7. In this example, the closing assembly 10, 20 10 comprises four female hooks 14c. These female hooks 14c are adapted to receive complementary protrusions (not illustrated in the figures), for example in the form of an arrow. Two of the hooks 14c are fixed on a first intermediate base 18c, while the two other hooks 14c are fixed to a second intermediate base 18c, distant and separated from the first intermediate base 18c. Each intermediate base 18c is also fixed to a wider base 18 by means of a respective intermediate connecting rod 19c, the base 18 in turn being fixed to the film by means of a connecting rod 19.

Preferably, the complementary profiles 14c are integrally formed with their respective intermediate base 18c, the intermediate connecting rods 19c, the base 18, the rod 19 and the film 2.

The connecting rods 19, 19c, 29 can be continuous over their entire length, or according to the longitudinal axis X. As a variant, they can be discontinuous.

Also, the complementary profiles 14, 24 can exhibit a constant section over their length, along the longitudinal axis X.

Figure 6:
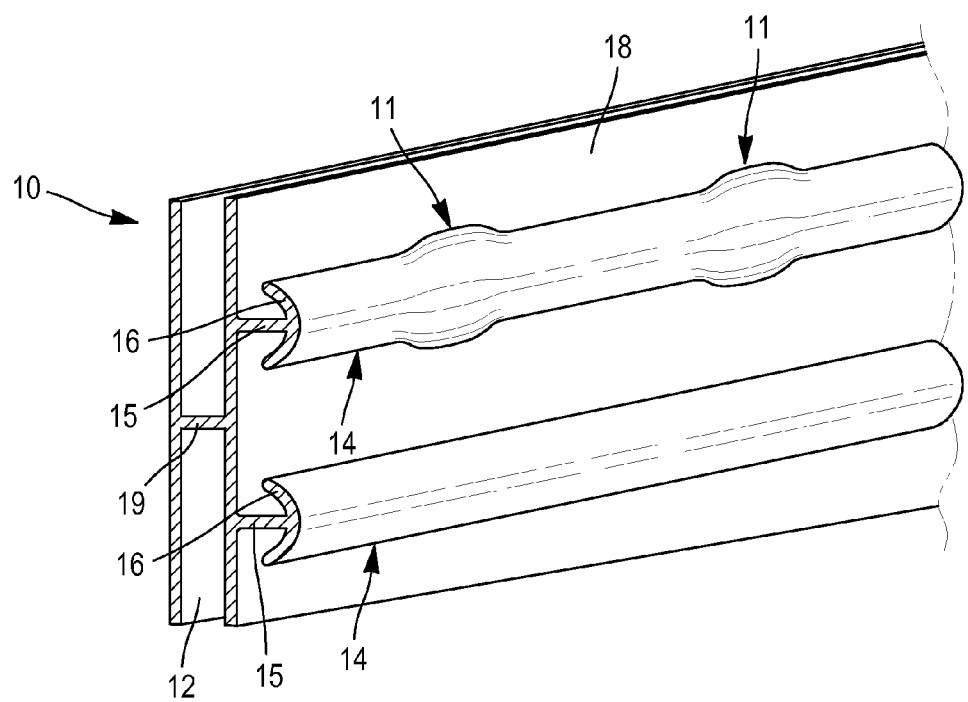
FIG. 6 is a perspective view of an embodiment of a closing assembly of a closure device according to a fourth embodiment of the invention.

As a variant, as illustrated in FIG. 6, the complementary profiles 14, 24 can comprise sequential alterations 11 transversally extending to the longitudinal axis X. The sequential alterations are local sequential modifications of the profiles, which can especially comprise sequential crushing of all or some of the profiles engaged, such that the sequential crushing realize flaring of the two complementary profiles 14, 24 engaged in the direction of the width transversal to the direction of elongation of the closure device 1, incisions without removal of materials, optionally stretched to form cuts, and/or cuts with removal of material.

In this variant embodiment, the manufacturing method S comprises a step during which all or some of the complementary profiles 14, 24, 14a, 24a, 14b, 24b of at least one of the closing assemblies 10, 20 are sequentially altered, the sequential alterations now formed transversally extending to the longitudinal axis X. For example, the complementary profiles 14, 24, 14a, 24a, 14b, 24b of the two closing assemblies 10, 20 can be engaged and all or some of the complementary profiles can be sequentially crushed so as to locally flare them in the direction transversal to the longitudinal direction X.

Reference could be made especially to application WO 2013/076120 for more details on the sequential alterations and their means of being obtained.

In this embodiment, all or some of the complementary profiles 14, 24 can present such sequential alterations. So in the example illustrated in FIG. 6, one of the profiles 14 comprises sequential crushing, while the other of the profiles 14 is devoid of sequential alteration.

The closing assemblies 10, 20 are preferably made integrally and in a single piece. So within each closing assembly 10, 20, the complementary profiles 14, 24, the base(s) 18, 28, the connecting rod(s) 19, 29 and the film 2 are integrally formed and in a single piece during the blown film extrusion method S.

The dilations/retractions of the film 2 following its coextrusion with the closing assemblies 10, 20 are therefore not transmitted to the bases 18, 28 of the complementary profiles 14, 24, which are therefore correctly aligned, and this improves their mutual engagement and therefore their sealing.

The closing assemblies 10, 20 can especially be made of at least one of the following materials: polypropylene, polyethylene, high-density polyethylene, low-density polyethylene and copolymers thereof, ethylene copolymers and/or propylene copolymers. In particular, the closing profiles 14, 24, the base 18, 28 and the connecting rod 19, 29 of the closing assemblies 10, 20 can be made of different materials selected from this list of materials. In fact, because of the connecting rod 19, 29, the complementary profiles 14, 24 are not deformed despite the fact that the materials constituting the complementary profiles and the film 2 are possibly different.

The invention claimed is:

1. A method for manufacturing a bag by means of blown film extrusion, said bag comprising main walls each comprising, on an internal face, a closing assembly comprising at least three complementary profiles which extend in parallel in a main direction extending according to a longitudinal axis, the manufacturing method comprising the following steps:

extruding plastic material so as to form an annular film comprising the closing assemblies, said annular film being intended to form the walls of the bag, and blowing the annular film at an inflation rate of less than 1.3 so as to form a jacket, wherein, the extrusion step further comprises integrally forming the at least three complementary profiles of each of the closing assemblies with one same base connected to the annular film extending a connecting rod in parallel to the longitudinal axis between the annular film and the base, and wherein the connecting rod is configured to keep the base at a distance from the annular film.

2. The manufacturing method according to claim 1, wherein the stretch rate is comprised between 5 and 15.

3. The manufacturing method according to claim 1, wherein, during the extrusion step, the complementary profiles of each closing assembly are integrally formed with their respective base by means of the associated connecting rod.

4. The manufacturing method according to claim 1, wherein the complementary profiles are of male/male or female/female type.

5. The manufacturing method according to claim 1, wherein at least one of the closing assemblies comprises at least four complementary profiles, said complementary profiles of the at least one closing assembly forming at least two groups of complementary profiles respectively extending from at least two separate bases, each of these separate bases being connected to the film by means of an associated connecting rod.

6. The manufacturing method according to claim 1, wherein the connecting rod centrally extends from the base of the corresponding closing assembly.

7. The manufacturing method according to claim 1, wherein the base comprises two longitudinal edges substantially extending in parallel to the longitudinal axis, and the manufacturing method further comprises a step during which one of the longitudinal edges of the base is locally fixed to the film.

8. The manufacturing method according to claim 1, further comprising a step during which all or some of the complementary profiles of at least one of the closing assemblies is sequentially altered, the sequential alterations now formed transversally extending to the longitudinal axis.

9. The manufacturing method according to claim 8, wherein at least one of the complementary profiles is devoid of sequential alterations.

10. The manufacturing method according to claim 1, wherein the connecting rod is discontinuous in its longitudinal direction according to the longitudinal axis.

11. The manufacturing method according to claim 1, wherein at least one of the closing assemblies comprises at least four complementary profiles, and wherein the complementary profiles are integrally formed with at least one intermediate base, connected to the base by means of an intermediate connecting rod extending in parallel to the longitudinal axis between the base, the intermediate base and adapted to keep the intermediate base at a distance from the base.

12. The manufacturing method according to claim 11, comprising at least two intermediate bases, each of the intermediate bases being connected to the base by means of a respective intermediate connecting rod.

13. A bag comprising main walls each comprising on an internal face a closing assembly comprising a series of complementary profiles which extend in parallel in a main direction extending according to a longitudinal axis, wherein review of complimentary profiles includes at least three complementary profiles integrally formed with one same base connected to the annular film by means of a connecting rod extending parallel to the longitudinal axis between the annular film and the base, and wherein the connecting rod is configured to keep the base at a distance from the annular film, the bag being obtained in accordance with a manufacturing method, according to claim 1.

* * * * *